US011874062B2

(12) United States Patent
Vild et al.

(10) Patent No.: US 11,874,062 B2
(45) Date of Patent: Jan. 16, 2024

(54) REPOSITIONABLE MOLTEN METAL PUMP

(71) Applicant: PYROTEK, INC., Spokane, WA (US)

(72) Inventors: Chris Vild, Chagrin Falls, OH (US); Jon Tipton, Aurora, OH (US)

(73) Assignee: Pyrotek, Inc., Spokane, WA (US)

( * ) Notice: Subject to any disclaimer, the term of this patent is extended or adjusted under 35 U.S.C. 154(b) by 127 days.

(21) Appl. No.: 17/266,063

(22) PCT Filed: Aug. 15, 2019

(86) PCT No.: PCT/US2019/046620

§ 371 (c)(1),
(2) Date: Feb. 4, 2021

(87) PCT Pub. No.: WO2020/037103

PCT Pub. Date: Feb. 20, 2020

(65) Prior Publication Data

US 2021/0310736 A1 Oct. 7, 2021

Related U.S. Application Data

(60) Provisional application No. 62/765,111, filed on Aug. 17, 2018.

(51) Int. Cl.
*F27B 3/04* (2006.01)
*F27D 3/14* (2006.01)
*F27D 27/00* (2010.01)

(52) U.S. Cl.
CPC ................ *F27B 3/045* (2013.01); *F27D 3/14* (2013.01); *F27D 27/005* (2013.01)

(58) Field of Classification Search
None
See application file for complete search history.

(56) References Cited

U.S. PATENT DOCUMENTS

| | | | | |
|---|---|---|---|---|
| 6,217,823 | B1 | 4/2001 | Vild et al. | |
| 9,494,366 | B1 | 11/2016 | Thut | |
| 9,612,055 | B1 | 4/2017 | Thut | |
| 2006/0180963 | A1 | 8/2006 | Thut | |
| 2013/0292427 | A1 | 11/2013 | Cooper | |
| 2014/0252698 | A1 * | 9/2014 | Rauch | F27D 21/0014 266/233 |

FOREIGN PATENT DOCUMENTS

| | | |
|---|---|---|
| JP | 2004149815 A | 5/2004 |

OTHER PUBLICATIONS

International Search Report for PCT/US2019/046620, dated Nov. 24, 2019, 6 pages.

* cited by examiner

*Primary Examiner* — Scott R Kastler
(74) *Attorney, Agent, or Firm* — Lippes Mathias LLP

(57) ABSTRACT

A molten metal pumping apparatus. The apparatus has each of a circulation function and a transfer function. The apparatus includes a molten metal pump having an outlet. The outlet is moveable while submerged in molten metal between a first position engaged with a circulation passage in a furnace assembly and a second position engaged with a transfer passage in the furnace assembly.

17 Claims, 3 Drawing Sheets

REPOSITIONABLE MOLTEN METAL PUMP

This application claims the benefit of U.S. Provisional Application No. 62/765,111 filed Aug. 17, 2018 which is incorporated herein by reference.

BACKGROUND

The present exemplary embodiment relates to a system for pumping molten metal. It finds particular application in conjunction with recycling of metals such as aluminum and will be described with particular reference thereto. However, it is to be appreciated that the present exemplary embodiment is also amenable to other similar applications.

Aluminum is the third most abundant element (after oxygen and silicon), and the most abundant metal, in the Earth's crust. It makes up about 8% by weight of the Earth's solid surface. Aluminum is remarkable for the metal's low density and for its ability to resist corrosion due to the phenomenon of passivation. Components made from aluminum and its alloys are vital to the world's production of structural materials. Aluminum is particularly valuable because of its further advantageous ability to be readily recycled.

Aluminum is typically either melted and cast into a finished product or cast into a billet for transport and eventual remelting and casting into the desired end product. Special handling equipment has been developed to facilitate the melting, processing, and transporting of molten aluminum.

Although the present disclosure has been associated with aluminum, it is noted that the equipment described herein may be equally suitable for use with other molten metals (and their salts), including zinc, magnesium, and nickel, as examples.

The process of molten metal handling and recycling is complex. It requires equipment for melting the metal, pumps for molten metal circulation, devices for submerging scrap metal pieces, devices for removal of impurities (e.g. filtering and degassing), devices for introduction of flux and other alloying agents, and devices for transport of the molten metal.

In a typical melting operation, a melting furnace is provided with an enclosed hearth and a connected open side well. A pump or other molten metal flow inducing apparatus is positioned in the side well and causes molten metal to circulate within the hearth. The side well may include a pump well and a melting bay which may be further divided into a charge well and a dross well. Metal may be melted by the introduction of solid bars to the main hearth and/or by the addition of metal pieces to the side well.

In the non-ferrous metals industry, scrap recycling has become a way of economic life. In fact, long before environmental concerns and conservation began to drive scrap recycling efforts, recycling of aluminum, copper, zinc, lead and tin occupied a firm niche in the marketplace. The metal pieces referenced above are often derived from recycled scrap materials.

The charge well can be utilized to melt metal scrap. Various pieces of equipment have been developed to help submerge the scrap pieces, and are referred to herein as scrap submergence devices. The dross well can be utilized to remove contaminants. Moreover, scrap metal is usually contaminated with organic and inorganic contaminants. Organic contaminants most commonly consist of remnants of various types of oils, coatings, or paints and the like. The inorganic contaminants may include dust particles, pigments, minor amounts of various scrap metals other than the principal metal, and the like. Aluminum scrap will also normally contain varying amounts of metal oxides. The majority of the contaminants will float to the top of the bath of molten metal or form slag or slag-like skin of inorganic contaminants on the molten metal which can be skimmed off of the metal in accordance with well-established techniques.

In the processing of molten metals, one commonly employed piece of equipment is a circulation pump for creating molten metal flow in a furnace. Another common type of equipment is a pump to pump molten metal from one vessel to another. When the molten metal needs to be removed from the furnace system by elevating it over a containment wall, a so-called transfer pump is often used. Most typical of this situation is where the transfer pump is placed in the open side well of a molten metal furnace to remove molten metal from the furnace, perhaps for introduction to a ladle and from there to die casters.

An aluminum recycling furnace is described in U.S. Pat. No. 6,217,823 and herein incorporated by reference. Referring now to FIG. 1, an aluminum recycling furnace 100 is depicted. Furnace 100 includes a main hearth component 120 which is heated, for example, with gas or oil burners or by any other means known in the art. Adjacent, and in fluid communication with the hearth 120, is the primary recycling area comprised of a side well 130 having a pump well 140, a charge well 160 and a dross well 180. Although not shown, the wall of the hearth 120 opens to the pump well 140, which opens to the charge well 160, which opens to the dross well 180, which in turn opens to the hearth 120 to allow the circulation pattern shown by the arrows. The pump well receives a molten metal pump. The molten metal pump circulates molten metal from the hearth 120 to the charge well 160 where scrap chips of the metal to be processed are deposited onto the surface of the melt. Molten metal from the charge well 160 flows into the dross well 180 where impurities in the form of dross are skimmed from the surface before the melt flows back into the hearth 120.

Referring now to FIG. 2, a molten metal circulation pump 200 within a pump well 201 of recycling furnace 203 is shown. Pump 200 includes a plurality of posts 205 attached to a base 207 and suspended from a motor mount 209. An impeller (not shown) is disposed within base 207 and connected to motor 210 via a shaft and coupling (not shown). Pump 200 circulates molten metal from pump well 201 into charge well 211 and dross well 213. The pump depicted in FIG. 2, is commonly referred to as a circulation pump.

The present disclosure advantageously provides a system that can accomplish both molten metal circulation and transfer of molten metal within a furnace using a single molten metal pump.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accord with one aspect of the present exemplary embodiment, a molten metal pumping apparatus is provided. The apparatus has each of a circulation function and a transfer function. The apparatus includes a molten metal pump having an outlet. The outlet is moveable while submerged in molten metal between a first position engaged with a circulation passage in a furnace assembly and a second position engaged with a transfer passage in the furnace assembly.

In accord with a second embodiment, a molten metal pumping apparatus including a molten metal pump and a scrap metal submergence device is provided. The scrap metal submergence device includes a first inlet directing molten metal to engage a vortex forming ramp and a second inlet directing molten metal to pass at least substantially horizontally through the device. An outlet of the pump is moveable while submerged in molten metal between a first position engaged with the first inlet and a second position engaged with the second inlet.

In accord with a third embodiment, a molten metal pumping system including a molten metal pump and a scrap metal submergence device is provided. The scrap metal submergence device includes a first inlet directing molten metal to engage a vortex forming ramp and a second inlet directing molten metal to pass at least substantially vertically through said device to a launder. An outlet of the pump is moveable while submerged in molten metal between a first position engaged with the first inlet and a second position engaged with the second inlet.

BRIEF DESCRIPTION OF THE DRAWINGS

The following is a brief description of the drawings, which are presented for the purposes of illustrating the exemplary embodiments disclosed herein and not for the purposes of limiting the same.

FIG. 4 is a perspective view of a second embodiment of the present molten metal pumping system as associated with a scrap submergence device; in

DETAILED DESCRIPTION

Figure 1:
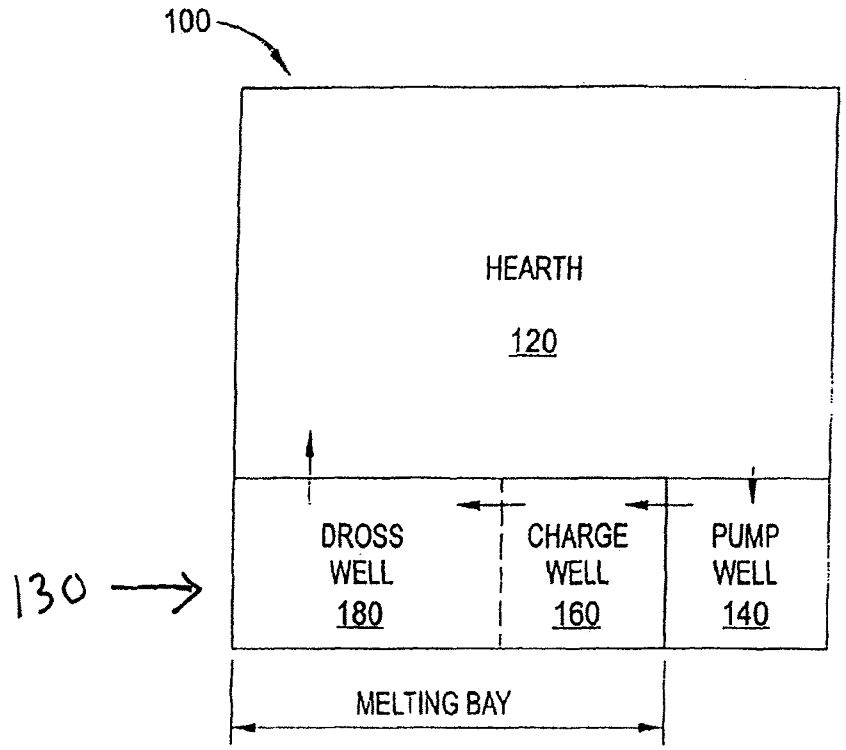
FIG. 1 PRIOR ART
FIG. 1 is a schematic illustration of a typical molten metal furnace.
Figure 2:
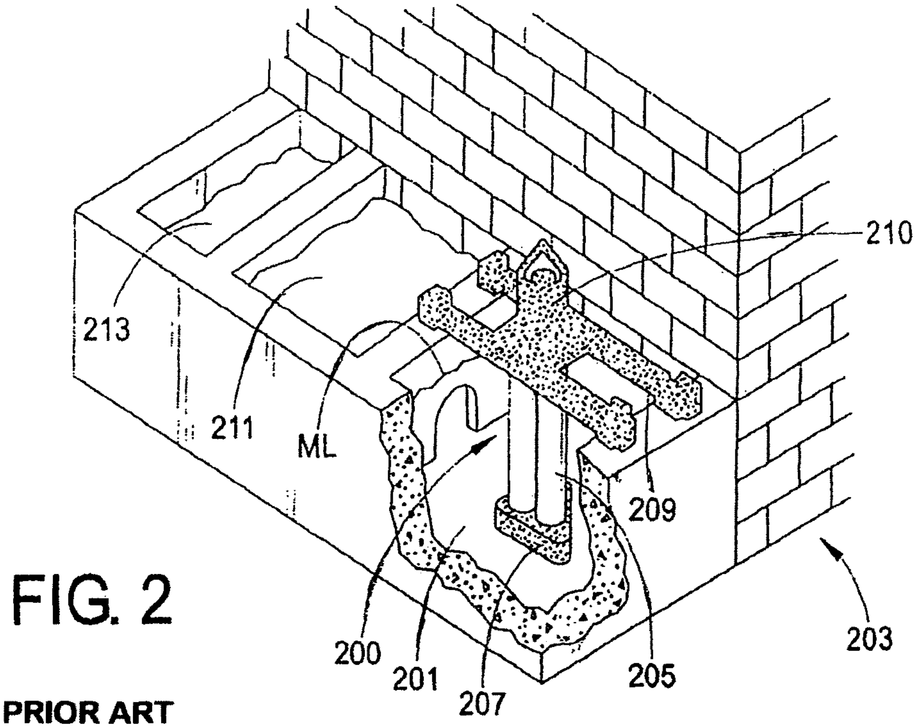
FIG. 2 PRIOR ART
FIG. 2 is a perspective view of a prior art molten metal furnace.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term. For example, substantially relative to an orientation can mean less than or equal to about a 33% variation, and in some embodiments, less than about a 20% variation.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Figure 3:
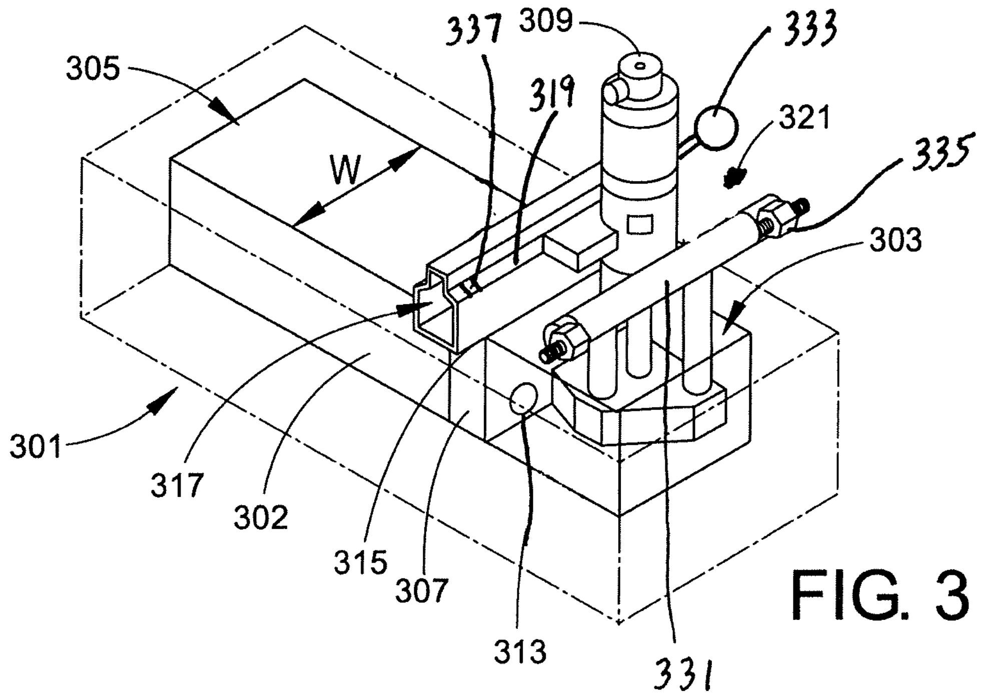
FIG. 3 is a perspective view of a first embodiment of the present molten metal pumping system.

Referring now to FIG. 3, a portion of a melt furnace 301 is illustrated. The furnace 301 includes in side well 302 having a pump well 303 and a second well 305 (optionally suitable for dross removal). The main hearth is located adjacent to furnace portion 301, and passages are provided between the pump well 303, the second well 305, and the main hearth. In operation, furnace portion 301 is filed with molten metal.

A wall 307 constructed of a refractory material such a graphite, ceramic or brick separates pump well 303 and second well 305. A circulation pump 309 is disposed in pump well 303. The pump can be a type available from the Metaullics System Division of Pyrotek, Inc. Exemplary pumps are described in U.S. Pat. Nos. 5,203,001 and 6,887,425, the disclosures of which are herein incorporated by reference.

Pump 309 can be either or both of a top or bottom inlet to receive molten metal entering pump well 303 from the main hearth of the furnace. Pump 309 includes an outlet facing wall 307. In some embodiments, the pump outlet may be in physical contact with the wall 307. In some embodiments, the pump outlet may be located close to wall 307, such as within greater than 0 to less than about 6 inches.

Wall 307 includes a first passage 313 that extends at least substantially horizontally to dross well 305. Wall 307 also includes a second passage (with which pump 309 is shown in alignment with in FIG. 3). The second passage includes an at least substantially vertical segment leading to a top surface 315 of wall 307. Top surface 315 includes a launder 317 which receives molten metal from the second passage and directs the molten metal out of the furnace assembly to a ladel or casting apparatus, for example.

Pump 309 is suspended on rails 319 and 321. Engagement between pump 309 and rails 319/321 is configured to allow pump 309 to selectively slide across a width "W" of pump well 303. In this manner, the outlet of pump 309 can be moved while pump well 303 contains molten metal to be in selective alignment with the first passage 313 to provide circulation of the furnace or the second passage to provide removal of molten metal from the furnace via launder 317. In certain embodiments engagement of the pump to the rails will include metal (e.g. steel alloy) roller 331 suitable for a high temperature environment.

In certain embodiments, the pump will be moved by a hydraulic arm 333 or other mechanism. In certain embodiments, the mechanism for sliding the pump will include stop elements 335 configured to position the pump into proper alignment with either the first or second passage. In certain embodiments, sliding the pump may be computer controlled. In certain embodiments, the rail(s) will include markings 337 to indicate suitable alignment with either the first or second passage and/or facilitate manual positioning of the pump relative to the first or second passage.

With reference now to a second embodiment, in a cold start or in a dry furnace condition, the vortexing well of the device described in U.S. Pat. No. 6,217,823 (the disclosure of which is herein incorporated by reference) has proven problematic if used as the charge well of the system depicted in FIG. 1. Moreover, if the molten metal processing system is at a low metal level (dry hearth), the inner wall serves as a dam to the flow of molten metal.

U.S. Pat. No. 9,476,644, herein incorporated by reference, discloses a modified charge well insert suitable for use in the system of FIG. 1 (as one example) which provides the advantages of both a strong vortexing design and operability in low molten metal depth conditions such as cold start and/or dry hearth. The present disclosure provides a unique alternative solution to the low molten metal level problem.

Figure 4:
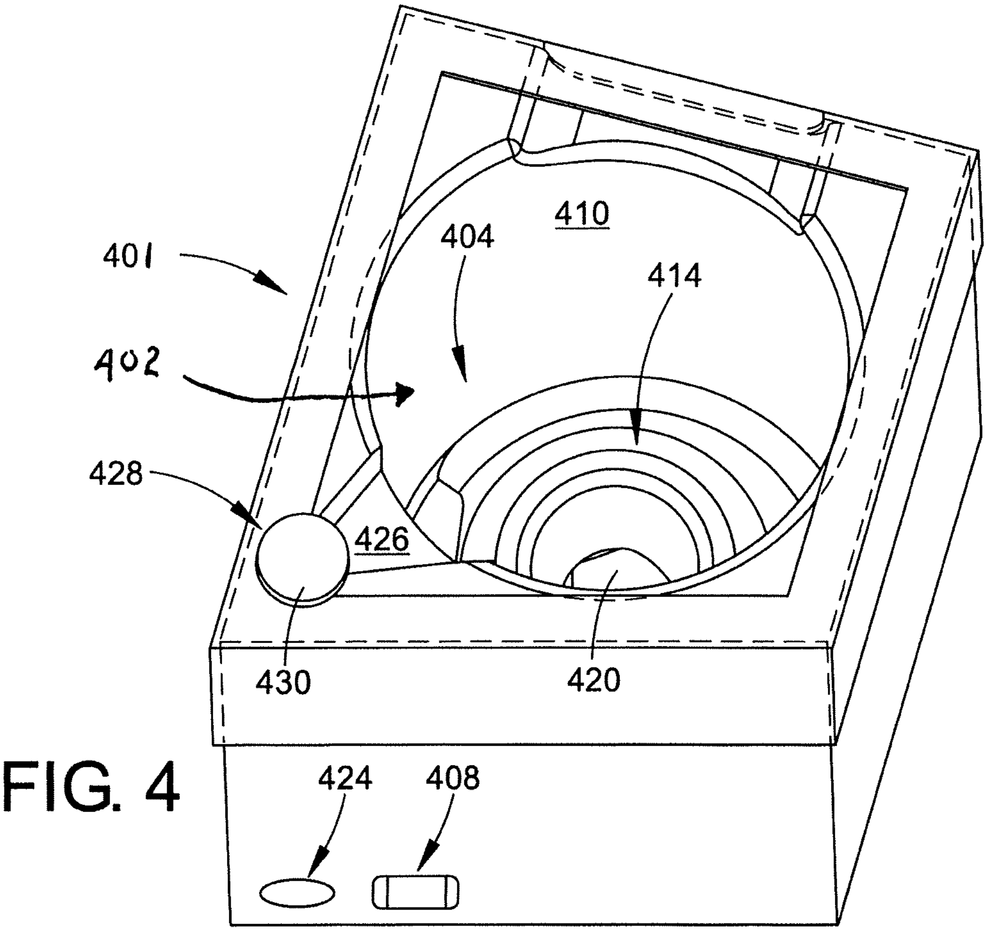

In accord with the present disclosure, a further alterative scrap submergence device configured to work in association with the repositionable molten metal pump is provided. With reference to FIG. 4, a charge well 401 defining a vortexing chamber 402 within which a ramp 404 resides is provided. Molten metal is direct by a molten metal pump into the chamber 402 via first inlet passage 408.

The molten metal entering chamber 402 is forced up ramp 404 which is disposed between outer chamber wall 410 and inner chamber wall 414. Ramp 404 can extend around the chamber 402 from a low point adjacent the charge well base wall relatively near inlet passage 408 to a point of merger with a shelf which also mergers with inner wall 414. Molten metal flowing up ramp 404 creates a rotation of the molten metal bath within the chamber 402 which tumbles into cavity 420 which is in communication with an outlet passage leading to an associated dross well. The tumbling of the molten metal into the cavity 420 creates a desirable folding action in the molten metal bath which is highly effective in submerging scrap materials.

A second inlet passage 424 extends substantially horizontally through chamber wall 414 to provide fluid communication directly with an adjacent dross well, by-passing the ramp inclusive charging region. This allows molten metal flow between the inlet leg of the system and the outlet leg of the system when the molten metal level is not sufficiently high to rise above the inner chamber wall of the vortexing chamber. This also allows molten metal to by-pass the vortexing well during periods of time where metal pieces are not being introduced therein.

Accordingly, the molten metal pump can be suspended on rails in the pump well adjacent the vortexing chamber 402 disposed in or forming the charge well. The pump can then be selectively slid between fluid communication with first inlet passage 408 when charging of metal is being performed and the second inlet passage 424 when charging of metal is not being performed. This allows operation in a dry furnace condition, avoids the unwanted creation of dross which can occur when the vortexing device is operating but then is no charging of metal pieces, and allows operation of the vortexing device when metal pieces are being added to the furnace system.

A safety overflow opening 426 can be provided to allow molten metal to be directed into the furnace rather than overflowing the charge well top in the event of a clog. Clean out port 428, selectively closed by a cap 430, is included to provide access to the second passage 424. So if/when the passage gets dirty, the cap can be removed and the passage can be reamed out.

Figure 5:
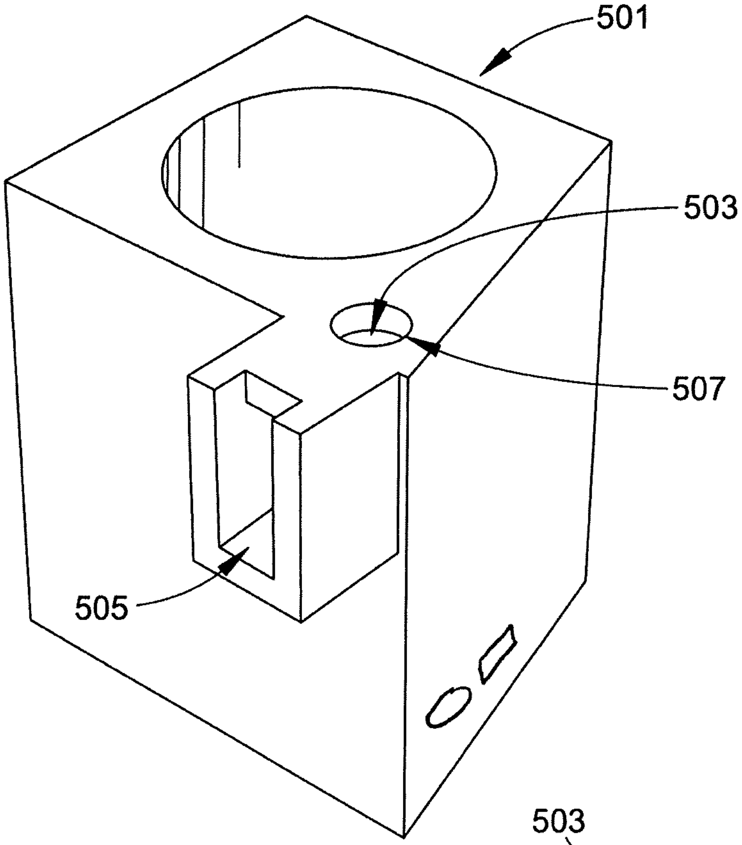
FIGS. 5 and 6 are perspective views of a further embodiment in which the scrap submergence device includes a transfer passage.
Figure 6:
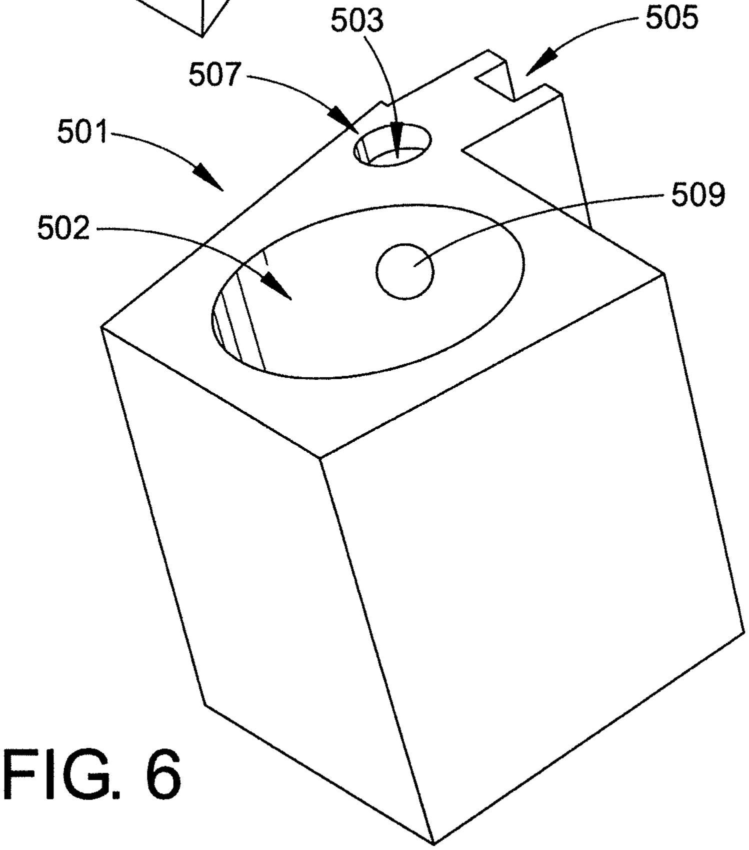

With reference to FIGS. 5 and 6 a further alternative scrap submergence device 501 is provided wherein a second inlet passage (e.g. 424 in FIG. 3) linked to a vertical passage 503 in fluid communication with a launder 505. Of course, the passage 408 to the votexing chamber can also be retained to receive the repositionable pump. Vertical passage 503 extends from the second passage inlet positioned to receive the repositionable pump. Vertical passage 503 can include a tangential outlet to the launder 505. The open end 507 of vertical passage 503 is provided to serve as a clean out port.

The vertical passage 503 can also include a tangential outlet 509 intersecting the vortexing chamber 502. Tangential outlet 509 can be positioned above the tangential outlet connecting to the launder to serve as a overflow channel back into the furnace system. Alternatively, the overflow opening 426 in FIG. 4 could be used to spill metal into the vortexing chamber 502 in the event that too much metal is being transferred out through the vertical passage.

The system of FIGS. 5 and 6 allows the molten metal pump to be positioned to drive molten metal into the votexing chamber 502 through an inlet for a scrap submergence function or repositioned to another inlet for transfer via launder 505.

Furthermore, it is contemplated that the embodiments of FIG. 4 and FIGS. 5/6 can be combined wherein three passages are provided to allow three functions including scrap submergence, vortex chamber by-pass for circulation, and transfer.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal pumping system having each of a circulation function and a transfer function, said system including a molten metal pump comprised of a base having a single outlet, said base being moveable horizontally while submerged in molten metal between a first position having the single outlet engaged with a circulation passage in a furnace assembly and a second position having the single outlet engaged with a transfer passage in the furnace assembly, said circulation passage and said transfer passage being formed in a refractory wall, the circulation and transfer passages being at the same vertical height above a bottom surface of the refractory wall, said wall separating a pump well housing said molten metal pump and another chamber of the furnace assembly.

2. The pumping system of claim 1 wherein said molten metal pump is suspended on a rail system to provide said horizontal movement.

3. The pumping system of claim 1 wherein said wall includes an at least substantially horizontal circulation passage and an at least substantially vertical transfer passage.

4. The pumping system of claim 3 wherein said transfer passage is in fluid communication with a launder adjacent a top portion of the wall.

5. The pumping system of claim 1 wherein an inlet to said circulation passage and an inlet to said transfer passage are coplanar, said plane being at least substantially horizontal.

6. The pumping system of claim 1 wherein said pump is a mechanical pump or an electromagnetic pump.

7. The pumping system of claim 2 wherein said molten metal pump includes steel rollers engaging the rail system.

8. The pumping system of claim 2 further including a stop arranged to position the molten metal pump with one of the circulation and transfer passages.

9. The pumping system of claim 2 further including a marking arranged to identify a position in which the molten metal pump is aligned with one of the circulation and transfer passages.

10. A molten metal pumping apparatus including a molten metal pump having a base including a single outlet and a scrap metal submergence device, said scrap metal submergence device including a first inlet directing molten metal to engage a vortex forming ramp and a second inlet directing molten metal to pass at least substantially horizontally through said device, said first and second inlets being disposed at an equal height on said scrap metal submergence device, the outlet of the pump being horizontally moveable while submerged in molten metal between a first position with the single outlet engaged with the first inlet and a second position with the single outlet engaged with the second inlet.

11. The pumping system of claim 10 further including an at least substantially vertical passage extending between a third inlet and a launder.

12. The pumping system of claim 11 further including a clean-out port intersecting one or both of the substantially horizontal passage and the substantially vertical passage and extending and intersecting a top surface of the scrap submergence device.

13. The pumping system of claim 12 wherein said clean-out port intersects a channel formed in the scrap submergence device, said channel configured to direct molten metal into a cavity enclosing a ramp.

14. The pumping system of claim 10 wherein said inlets are different shapes and/or cross-sectional sizes.

15. A molten metal pumping system including a riserless molten metal pump having a single outlet and a scrap metal submergence device, said scrap metal submergence device including a first inlet directing molten metal to engage a vortex forming ramp and a second inlet directing molten metal to pass at least substantially vertically through said device to a launder, the outlet of the pump being moveable while submerged in molten metal between a first position engaged with the first inlet and a second position engaged with the second inlet, wherein said scrap metal submergence device includes a clean out port in a top surface which intersects a passage between the second inlet and the launder, wherein the clean out port can be selectively sealed with a cap member.

16. The pumping system of claim 14 wherein said pump is suspended on a rail system.

17. The pumping system of claim 16 wherein said pump is moved on said rail system via a hydraulic apparatus.

* * * * *